US010638446B2

(12) United States Patent
Grabbe et al.

(10) Patent No.: US 10,638,446 B2
(45) Date of Patent: Apr. 28, 2020

(54) LOCATION SYSTEM AND METHOD FOR OPERATING A LOCATION SYSTEM FOR DETECTING THE POSITION OF AT LEAST ONE MOBILE UNIT IN A GOODS LOGISTICS FACILITY

(71) Applicant: Jungheinrich AG, Hamburg (DE)

(72) Inventors: Florian Grabbe, Hamburg (DE); Stefan Ahrens, Rellingen (DE); Sven-Ole Heise, Osterrönfeld (DE); Jan Kopelke, Hamburg (DE); Tony Altmann, Brokstedt (DE)

(73) Assignee: Jungheinrich AG, Hamburg (DE)

( * ) Notice: Subject to any disclaimer, the term of this patent is extended or adjusted under 35 U.S.C. 154(b) by 0 days.

(21) Appl. No.: 16/292,647

(22) Filed: Mar. 5, 2019

(65) Prior Publication Data

US 2019/0274114 A1  Sep. 5, 2019

(30) Foreign Application Priority Data

Mar. 5, 2018 (DE) ........................ 10 2018 104 989

(51) Int. Cl.
*H04W 64/00* (2009.01)
*G06F 8/71* (2018.01)
(Continued)

(52) U.S. Cl.
CPC ......... *H04W 64/003* (2013.01); *G01S 5/0236* (2013.01); *G06F 8/71* (2013.01);
(Continued)

(58) Field of Classification Search
CPC ...... H04W 64/003; G01S 5/0236; G06F 8/71; G06Q 10/08; G06Q 50/28; H04L 67/34
See application file for complete search history.

(56) References Cited

U.S. PATENT DOCUMENTS 6,820,088 B1 * 11/2004 Hind ..................... G06F 16/275
7,640,004 B2 * 12/2009 Muratsu .............. H04L 63/0869
455/41.2
(Continued)

FOREIGN PATENT DOCUMENTS

DE   102005055102 A1   8/2006
DE   102011016030 A1   9/2012
DE   102016107940 A1   11/2017

OTHER PUBLICATIONS

IEEE Standard for Low-Rate Wireless Networks; IEE Computer Society, pp. 1-708, IEEE Std 802.15.4-2015.
(Continued)

*Primary Examiner* — Magdi Elhag
(74) *Attorney, Agent, or Firm* — Rankin, Hill & Clark LLP (57) ABSTRACT

A method for operating a positioning system for acquiring the position of at least one mobile unit in a goods logistics facility and a corresponding positioning system are provided. The method includes determining first status information of a first user configuration of the positioning system stored on a first storage medium of a first unit, determining second status information of a second user configuration of the positioning system stored on a second storage medium of a second unit, transmitting the first status information from the first unit to the second unit via a wireless data connection, comparing the first status information with the second status information in the second unit, and generating at least one control message in the second unit if the first status information does not match the second status information.

12 Claims, 4 Drawing Sheets

(51) Int. Cl.
  *H04L 29/08* (2006.01)
  *G06Q 10/08* (2012.01)
  *G06Q 50/28* (2012.01)
  *G01S 5/02* (2010.01)

(52) U.S. Cl.
  CPC ............ *G06Q 10/08* (2013.01); *G06Q 50/28* (2013.01); *H04L 67/34* (2013.01)

(56) References Cited

U.S. PATENT DOCUMENTS

| | | | |
|---|---|---|---|
| 8,296,733 B2* | 10/2012 | Phillips | G05B 19/056 |
| | | | 717/120 |
| 9,413,664 B1* | 8/2016 | Sun | H04L 47/10 |
| 10,126,419 B2 | 11/2018 | Heldmaier et al. | |
| 2008/0209414 A1 | 8/2008 | Stein | |
| 2010/0228428 A1 | 9/2010 | Harshbarger et al. | |
| 2010/0267376 A1* | 10/2010 | Saari | G06F 8/38 |
| | | | 455/418 |
| 2011/0010383 A1* | 1/2011 | Thompson | H04L 41/0213 |
| | | | 707/769 |
| 2012/0122501 A1* | 5/2012 | Lai | H04L 41/0846 |
| | | | 455/500 |
| 2012/0177032 A1* | 7/2012 | Chitty | H04L 12/66 |
| | | | 370/352 |
| 2016/0036814 A1* | 2/2016 | Conrad | H04W 12/0023 |
| | | | 713/171 |
| 2017/0315223 A1 | 11/2017 | Heldmaier et al. | |
| 2018/0097690 A1* | 4/2018 | Yocam | H04L 67/104 |

OTHER PUBLICATIONS

IEEE Standard for Information technology—Telecommunications and information exchange between systems Local and metropolitan area networks—Specific requirements—Part 11: Wireless LAN Medium Access Control (MAC) and Physical Layer (PHY) Specifications; pp. 1-899; IEEE Std 802.11-2016.

IEEE Standard for Information technology—Telecommunications and information exchange between systems Local and metropolitan area networks—Specific requirements—Part 11: Wireless LAN Medium Access Control (MAC) and Physical Layer (PHY) Specifications; pp. 900-1799; IEEE Std 802.11-2016.

IEEE Standard for Information technology—Telecommunications and information exchange between systems Local and metropolitan area networks—Specific requirements—Part 11: Wireless LAN Medium Access Control (MAC) and Physical Layer (PHY) Specifications; pp. 1800-3533; IEEE Std 802.11-2016.

* cited by examiner

LOCATION SYSTEM AND METHOD FOR OPERATING A LOCATION SYSTEM FOR DETECTING THE POSITION OF AT LEAST ONE MOBILE UNIT IN A GOODS LOGISTICS FACILITY

PRIORITY CLAIM

This application claims priority to DE 10 2018 104 989.7, filed of Mar. 5, 2018, which is hereby incorporated by reference in its entirety.

BACKGROUND OF INVENTION

Field of Invention

The invention relates to a method for operating a positioning system for acquiring the position of at least one mobile unit in a goods logistics facility. Furthermore, the invention relates to a positioning system for acquiring the position of at least one mobile unit in a goods logistics facility.

Brief Description of Related Art

In goods logistics facilities such as warehouses, the position acquisition of various movable objects such as user end devices carried by persons, industrial trucks, or goods, is advantageous for an efficient operation. With positioning systems that enable such a position acquisition, for example the distances traveled can be understood and optimized, locations verified, collisions avoided, infrastructure components such as roll-up doors can be switched, and zones within an acquisition range of the positioning system can be defined.

Positioning systems frequently comprise stationary units and mobile units. Using stationary units, a reference system is established so that the positions of the mobile units relative to the stationary units can be determined within an acquisition range of the positioning system, e.g. by multilateration. Stationary units are anchor nodes, for example, which are arranged at defined fixed points. Mobile units are, for example, a user end device, a control system of an industrial truck that is configured accordingly, or a positioning unit arranged on an industrial truck. The industrial truck itself, too, can be considered a mobile unit.

In many cases, it is possible to set up user configurations for positioning systems. In these user configurations, for example the current positions of the stationary units are stored. Moreover, circular zones with a specifiable radius around the stationary units can be defined. Additionally, virtual zones can be defined within the acquisition range, and the position, dimensions, and shape of the virtual zones can be stored in the user configuration. Different functions can be linked to the circular zones and virtual zones. They can be warning zones, for example, in which industrial trucks run at a reduced speed.

Additionally, positioning systems are frequently set up as decentralized entities. Such a decentralized positioning system does not require a central unit in which all information of the positioning system converges. Instead, the communication takes place directly between the individual units of the positioning system without the detour through a central unit.

With such a decentralized positioning system, it is, however, necessary for updating the user configuration to distribute the current version of the user configuration to all units involved. With a goods logistics facility having a large number of anchor nodes and industrial trucks, this is connected with a major amount of work. If a unit is overlooked during the update, this can impair the operation of the positioning system of the goods logistics facility. If the positioning system is used for collision avoidance, an incorrect update of a user configuration of a unit can under some circumstances impair the safe operation within the goods logistics facility.

It is an object of the invention to provide a method for operating a positioning system of a goods logistics facility and a positioning system, wherein the operation and in particular updating of the positioning system shall be possible with low complexity.

The object is solved by means of a method for operating a positioning system for acquiring the position of at least one mobile unit within a goods logistics facility as described and claimed herein.

BRIEF SUMMARY OF THE INVENTION

A method for operating a positioning system for acquiring the position of at least one mobile unit within a goods logistics facility is provided. The positioning system includes a data communication system that has at least one stationary unit and the at least one mobile unit. The method is further developed by the following steps of the method:

Determining first status information of a first user configuration of the positioning system stored on a first storage medium of a first unit, Determining second status information of a second user configuration of the positioning system stored on a second storage medium of a second unit, Transferring the first status information from the first unit to the second unit via a wireless data connection, Comparing the first status information with the second status information in the second unit, and Generating at least one control message in the second unit if the first status information does not match the second status information.

A goods logistics facility is, for example, a warehouse or open-air space, an industrial building, a workshop building, a contiguous complex of such buildings or open-air spaces, and, if applicable, surrounding works premises.

A mobile unit within the context of the present description is, for example, a user end device, a control system of an industrial truck, a positioning unit attached to an industrial truck, particularly a permanently installed one, or an industrial truck as a whole. Such units are each equipped with means for establishing a wireless data connection with another unit and for transmitting information/data via this data connection.

A stationary unit within the context of the present description is in particular an anchor node that is disposed at a defined and known location of the goods logistics facility. The stationary unit has a communication means for establishing a wireless data connection and for transmitting information/data via this data connection. In particular, the stationary units are reference points of a coordinate system, wherein the distance measurements between the stationary units and the mobile units make it possible to determine positions of the mobile units if the distance between the mobile unit and a sufficiently large number of anchor nodes is known. For the distance measurement, a propagation delay measurement or a measurement of the signal strength can be performed, for example.

The first unit can be a mobile unit or a stationary unit. The second unit can also be a mobile unit or a stationary unit. Both units each include a storage medium on which a user configuration of the positioning system is stored. Also included is the case in which the user configuration of one unit or both units does not contain any configuration information, i.e., there is for example no information stored in the user configuration on the positions of the stationary units or virtual zones. Additionally, the case is also included where one of the storage media does not have any user configuration stored on it.

The status information of the user configuration contains information on the version of the user configuration, for example a version number and a point in time at which the user configuration was created. The case in which no user configuration exists shall also be considered status information.

The status information of the user configuration of the first unit and the second unit are determined, for example by accessing the corresponding storage media. The first unit transmits the first status information to the second unit, after which the second unit compares the first status information with the second status information. If the status information instances do not match, the second unit will generate a control message.

The status information instances do not match if the version numbers and/or the points in time of their creation differ, and/or if one of the user configurations does not contain any configuration information, and/or if one of the units does not have any user configuration stored on it.

Preferably, the second status information is transmitted from the second unit to the first unit via the wireless data connection after determining the first status information and the second status information, wherein the first status information is compared with the second status information in the first unit, and wherein furthermore at least one control message is generated in the first unit if the first status information does not match the second status information.

Thus, both the first unit and the second unit check whether the status information instances of the two units match. In this manner, redundancy is established, so that a control message will be generated even if the transmission of the first status information or the comparison between the first and the second status information in the second unit fails. Additionally, it is unnecessary in this case that the second unit communicates the result of the comparison to the first unit. By generating a control message through the first unit, it is moreover possible to transmit this control message to another unit that is within the communications range of the first unit but not within the communications range of the second unit.

Also preferably, the first status information and the second status information each comprises version information of the user configuration, wherein the unit with newer version information is defined as a current unit and the unit with older version information is defined as a non-current unit after comparing the first status information with the second status information, provided that the version information instances differ from one another, wherein particularly the second unit transmits a version message to the first unit as a control message, wherein the version message comprises information on whether the first unit is the current unit or the non-current unit, or if the two version information instances are identical.

The version information forms part of the status information and includes the version number and/or the point in time when the user configuration was generated. In accordance with an embodiment, the unit with the higher version number is defined as the current unit, and the unit with the lower version number is defined as the non-current unit. In accordance with an alternative embodiment, the unit with the newer time of creation of the user configuration is defined as the current unit, and the unit with the older time of creation of the user configuration is defined as the non-current unit.

As a control message, it is possible to for example notify a user of the positioning system that the non-current unit uses an outdated user configuration. In particular, the user can be given the positions and/or codes of the non-current units.

The transmission of a version message to the first unit is useful predominantly in the case where the comparison of the first status information and the second status information is performed exclusively by the second unit.

Preferably, at least one of the control messages is a warning message that is displayed on the display of the non-current unit and/or is transmitted to a third unit.

If the non-current unit is an industrial truck, the warning message is, for example, displayed on a display of the industrial truck where it is easily visible for the operator. Alternatively or additionally, an acoustic warning message can be issued. In this manner, the operator of the industrial truck is notified that the user configuration stored on the industrial truck is outdated, and that they should update this user configuration. In case the industrial truck is the second unit, the warning message is shown directly on the display of the industrial truck. If, on the other hand, the industrial truck is the first unit, the warning message is first transmitted by the second unit to the industrial truck and displayed by the industrial truck on the display.

If the non-current unit is, for example, an anchor node, the warning is transmitted to another unit, e.g. a control computer. A user or an administrator who has access to the control computer is notified about the outdated user configuration of the anchor node and can initiate the update of the user configuration. Additionally, this method can also be used where the non-current unit is an industrial truck or another type of mobile unit or stationary unit.

In accordance with one embodiment, the current unit transmits its user configuration via the wireless data connection to the non-current unit, with the non-current unit updating its user configuration by replacing its user configuration with the user configuration received from the current unit.

Advantageously, this achieves a fast and simple updating of the user configuration of the non-current unit. In this embodiment, it is not necessary that a current version of the user configuration is transmitted by a third unit to the non-current unit, since this takes place directly via the data connection with the current unit. Thus, it is also not necessary to establish a data connection with another unit from which the non-current unit could receive a current user configuration.

If the second unit is the non-current unit, an update request is transmitted as the control message to the first unit, which then transmits the user configuration of the first unit to the second unit. If, on the other hand, the second unit is the current unit, the user configuration is transmitted to the first unit as the control message.

If the current unit is a stationary unit and the non-current unit is a mobile unit, it is advantageous if the user configuration of the mobile unit is updated while it is within communications range of the stationary unit. In this manner, a simple method is provided for updating the user configurations on all industrial trucks of a goods logistics facility in a fast and uncomplicated way. The update is performed while the industrial trucks move past updated anchor nodes in the goods logistics facility. This eliminates the necessity for supplying the industrial trucks individually and/or in a specially designated location with an updated user configuration.

In accordance with another embodiment, a first part of the user configuration of the current unit that has already been transmitted is stored on the storage medium of the non-current unit if the wireless data connection is interrupted while the user configuration is transmitted, with a second part of the user configuration of the current unit being transmitted to the non-current unit when the wireless data connection is restored.

Advantageously, this embodiment provides that the user configuration is transmitted to the non-current unit in several parts. A transmission of the user configuration in parts is useful if the user configuration comprises a large data volume and if at least one of the units is a mobile unit. In this case, it is possible that, during the timeframe when the mobile unit is within communications range of the other unit, the user configuration cannot be transmitted entirely. With the non-current unit storing the first part that has already been transmitted on its storage medium, it is possible to resume the transmission with the second part of the user configuration when the two units are within mutual communications range once again. The user configuration can also be transmitted to the non-current unit in more than two parts where necessary. In particular, the second part of the user configuration can also be transmitted to the non-current unit by a third unit. For example, an industrial truck with a non-current user configuration can receive a first part of the current user configuration from a first anchor node, a second part from a second anchor node, and a third part from another industrial truck. Thereby, the user configuration of the industrial truck is updated while it moves throughout the goods logistics facility. The operation of the industrial truck is consequently not being interrupted by the update process.

Also preferably, at least one of the control messages is an update request that is transmitted to a third unit via a wired or wireless data connection, wherein a third user configuration exists within the third unit, the version information of which is at least as current as the newer version information, with the third unit transmitting the third user configuration to the non-current unit and with the non-current unit updating its user configuration by replacing its user configuration with the third user configuration.

In accordance with this embodiment, it is thus not the user configuration of the current unit but the third user configuration of the third unit that is transmitted to the non-current unit. The third unit can be e.g. a control computer on which the respective most current version of the user configuration is stored. Thereby, it is ensured that the non-current unit is always updated to the most current version of the user configuration. Moreover, a data connection with a higher transmission rate than the wireless data connection between the first unit and the second unit can also be provided between the non-current unit and the third unit, so that the user configuration is quickly transmitted to the non-current unit.

Preferably, the updated user configuration is transmitted by the previously non-current unit to another unit via a wireless data connection.

Advantageously, this achieves that the current version of the user configuration quickly spreads to all units throughout the goods logistics facility. For example, a current version of the user configuration is transmitted by an anchor node to an industrial truck passing it. This industrial truck transmits the current version further to another anchor node and an oncoming industrial truck, which, in turn, transmit the current version further.

Preferably, the wireless data connection between the units is implemented by means of ultra-wideband technologies, using WLAN (IEEE-802.11), or with ZigBee (IEEE-802.15.4). In accordance with an embodiment, it is provided that a first part of the wireless data connection is implemented with a first communication technology, for example ultra-wideband technology, and a second part of the wireless data connection is implemented with a second communications technology, for example via a wireless local area network (WLAN or ZigBee). Thus, e.g. information used for position acquisition is transmitted using ultra-wideband technology, and the status information, the control messages, and the user configurations are transmitted via WLAN or ZigBee.

The object is additionally solved by a positioning system for acquiring the position of at least one mobile unit in a goods logistics facility, comprising a data communication system that has at least one stationary unit and the at least one mobile unit, wherein the positioning system is configured for determining a first status information instance of a first user configuration of the positioning system that is stored on a first storage medium of a first unit and for determining a second status information instance of a second user configuration of the positioning system that is stored on a second storage medium of a second unit, with the first unit being configured for transmitting the first status information via a wireless data connection from the first unit to the second unit, and with the second unit being configured for comparing the first status information with the second status information and for generating a control message if the first status information does not match the second status information.

The same or similar advantages apply to the positioning system as were previously mentioned with respect to the method for operating a positioning system.

Preferably, the second unit is configured for transmitting the second status information from the second unit to the first unit via the wireless data connection, with the first unit being configured for comparing the first status information with the second status information and generating at least one control message if the first status information does not match the second status information.

Also preferably, the first status information and the second status information each comprises version information of the user configuration, wherein the positioning system is configured for defining the unit with newer version information as the current unit and the unit with older version information as a non-current unit after comparing the first status information with the second status information, provided that the version information instances differ from one another, wherein particularly the second unit is configured for transmitting a version message to the first unit as a control message, wherein the version message comprises information on whether the first unit is the current unit or the non-current unit, or if the two version information instances are identical.

Preferably, at least one of the control messages is a warning message wherein the positioning system is configured for displaying the warning message on a display of the non-current unit and/or for transmitting it to a third unit.

In accordance with one embodiment, the current unit is configured for transmitting its user configuration via the wireless data connection to the non-current unit, with the non-current unit being configured for updating its user configuration by replacing its user configuration with the user configuration of the current unit.

In accordance with an alternative embodiment, the positioning system comprises a third unit, wherein a third user configuration exists within the third unit, the version information of which is at least as current as the newer version information, wherein at least one of the control messages is an update request with the second unit being configured for transmitting the update request via a wired or a wireless data connection to the third unit, wherein the third unit is configured for transmitting the third user configuration to the non-current unit with the non-current unit being configured for updating its user configuration by replacing its user configuration with the third user configuration.

Preferably, at least one stationary unit is a source unit, wherein the positioning system comprises a control unit in which a new user configuration can be created, with the source unit being configured for receiving the new user configuration from the control unit and furthermore being configured for transmitting the new user configuration via the wireless data connection to the at least one mobile unit and/or at least one additional stationary unit.

The source unit is, for example, an anchor node that is specially configured for transmitting the respective most current user configuration. For this purpose, a new user configuration is created on the control unit, which is a control computer, for example, and this new user configuration is transmitted to the source unit. Industrial trucks passing the source unit, other mobile units, and other anchor nodes within communications range are updated to the new version of the user configuration by the source unit. This is useful in particular where the source unit is configured with means for establishing a wireless data connection with a particularly high data transmission rate, so that the source unit can quickly transmit the user configuration to the other units.

Further features of the invention will become apparent from the description of the embodiments according to the invention together with the claims and the attached drawings. Embodiments according to the invention can fulfill individual features or a combination of several features.

BRIEF DESCRIPTION OF THE DRAWINGS

The invention is described below, without restricting the general idea of the invention, based on exemplary embodiments in reference to the drawings, whereby we expressly refer to the drawings with regard to the disclosure of all details according to the invention that are not explained in greater detail in the text. In the following.

In the drawings, in each case the same or similar elements and/or parts are provided with the same reference numbers, so that in each case a repeated introduction is omitted.

DETAILED DESCRIPTION OF THE INVENTION

Figure 1:
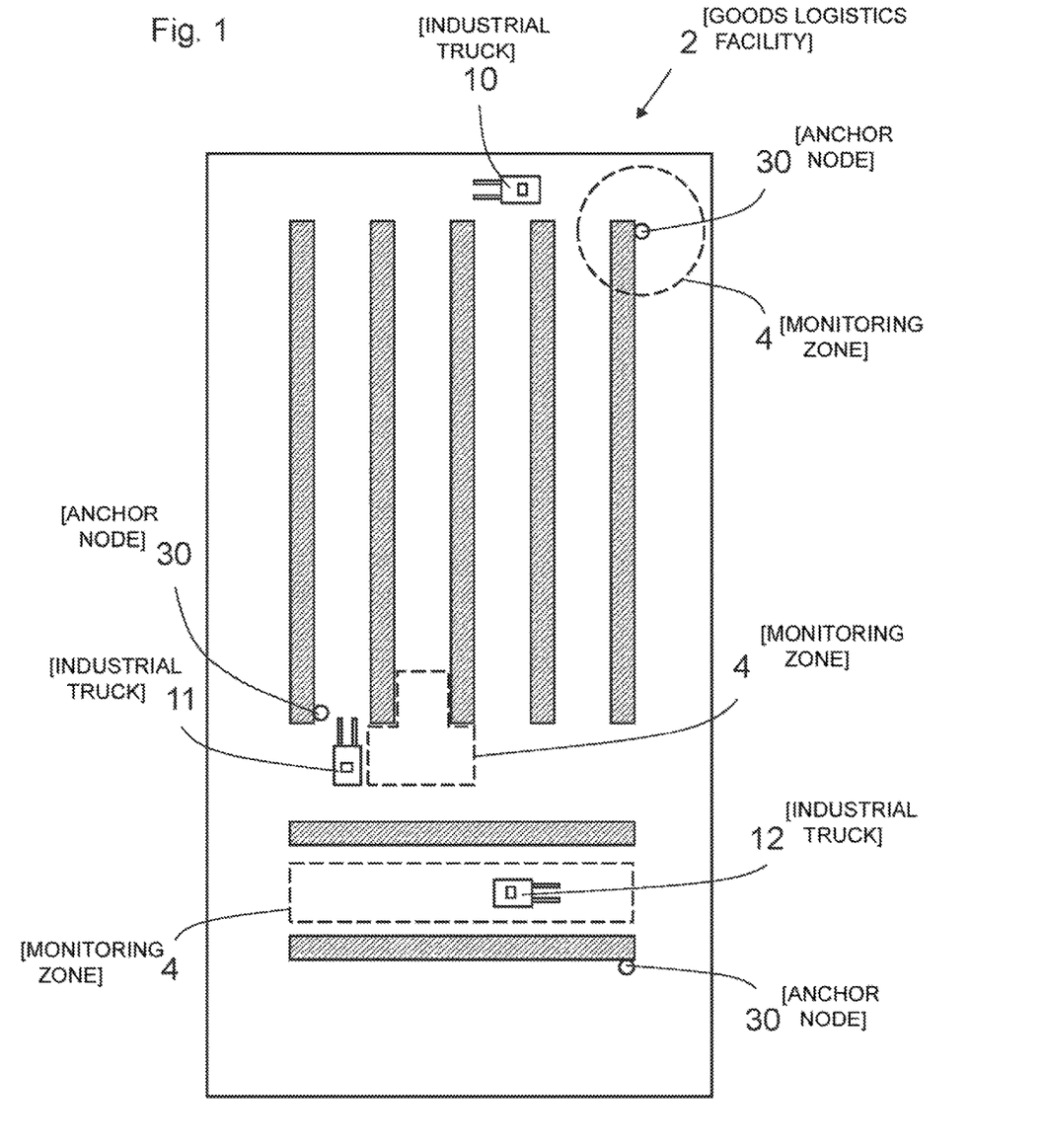
FIG. 1 shows a simplified representation of a goods logistics facility with a positioning system having mobile units and stationary units.

FIG. 1 shows a goods logistics facility 2 in a simplified representation, for example a warehouse. The goods logistics facility 2 is equipped with anchor nodes 30, which are disposed in stationary locations throughout the goods logistics facility 2. The anchor nodes 30 define reference points for a coordinate system of the positioning system. Additionally, the anchor nodes 30 are equipped with communication means for signal transmission, for example for transmitting signals using ultra-wideband technology. At the goods logistics facility 2, industrial trucks 10, 11, 12 are used additionally, which are also equipped with communication means for signal transmission. By means of the positioning system, the positions of the industrial trucks 10, 11, 12 throughout the goods logistics facility 2 can be established by determining the distances between the industrial trucks 10, 11, 12 and the anchor nodes 30. This is achieved for example by means of propagation delay measurements or by measuring the signal strength of a signal between the anchor nodes 30 and the industrial trucks 10, 11, 12.

Moreover, monitoring zones 4 are defined within the goods logistics facility 2. These monitoring zones 4 can be e.g. a zone surrounding an anchor node 30. Alternatively, the monitoring zones are set up as virtual zones that include a coordinate range within the coordinate system of the positioning system. Such monitoring zones 4 can be configured for defining a zone with a speed limit for industrial trucks 10, 11, 12, for example. In this manner, collisions between industrial trucks 10, 11, 12 can be avoided.

The position, shape, and dimensions of the monitoring zones 4, the positions of the anchor nodes 30, and an object action allocated to the monitoring zones 4 or the anchor nodes 30, respectively, can be individually defined by the user and are stored in a user configuration. An object action is, for example, a braking of an industrial truck 10, 11, 12 to a permissible maximum speed (low-speed run) when it is present within a monitoring zone 4 or in a circular zone surrounding an anchor node 30.

Figure 2:
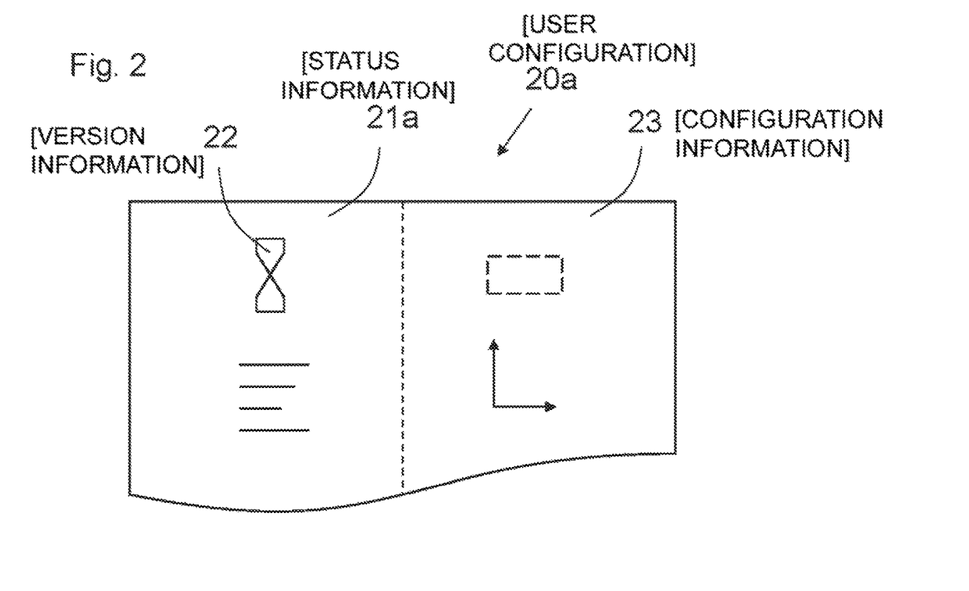
FIG. 2 shows a simplified representation of a user configuration of a positioning system.

FIG. 2 shows a simplified representation of such a user configuration 20a. The user configuration 20a is a data record of the configuration information 23 such as the positions of the anchor nodes 30 and the size, shape, and dimensions of the monitoring zones 4, as well as the object actions allocated to the monitoring zones 4 or the anchor nodes 30, respectively. Additionally, the user configuration 20a includes status information 21a, which, in turn, includes the version information 22. The version information 22 is, for example, the version number and/or the point in time when the user configuration 20a was generated. Additionally, the status information 21a includes information on whether configuration information 23 is stored at all in the user configuration 20a.

Figure 3:
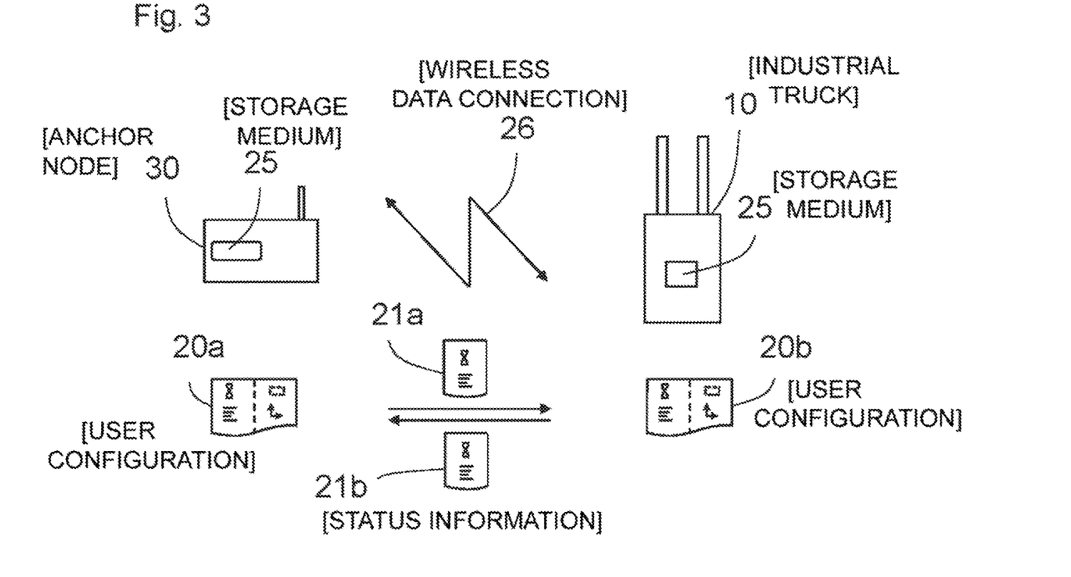
FIG. 3 shows a simplified representation of a wireless data connection between two units for comparing status information.

FIG. 3 shows a simplified representation of how the user configurations 20a, 20b of two units of the positioning system are compared. A stationary unit, in this case an anchor node 30, and a mobile unit, in this case an industrial truck 10, each include a storage medium 25, on each of which a user configuration 20a, 20b is stored. A wireless data connection 26 is established between the units via which at least one of the units transmits the status information 21a, 21b of its user configuration 20a, 20b to the other unit. The other unit compares this status information 21a, 21b with the status information 21a, 21b of its own user configuration 20a, 20b and generates a control message if the status information 21a, 21b instances do not match. This is the case, for example, if the version information 22 instances are different, if the configuration information 23 of one of the user configurations 20a, 20b is blank, or if a unit does not have any user configuration 20a, 20b. As a control message, for example a version message is transmitted to the other unit, wherein the version message comprises information on whether the first unit is the current unit or the non-current unit, or whether both version information instances are identical.

Alternatively, either unit can, as is shown in FIG. 3, transmit its status information 21a, 21b to the other unit. The comparison of the status information 21a, 21b and, if applicable, the generation of the control message, then take place in both units.

Figure 4A:
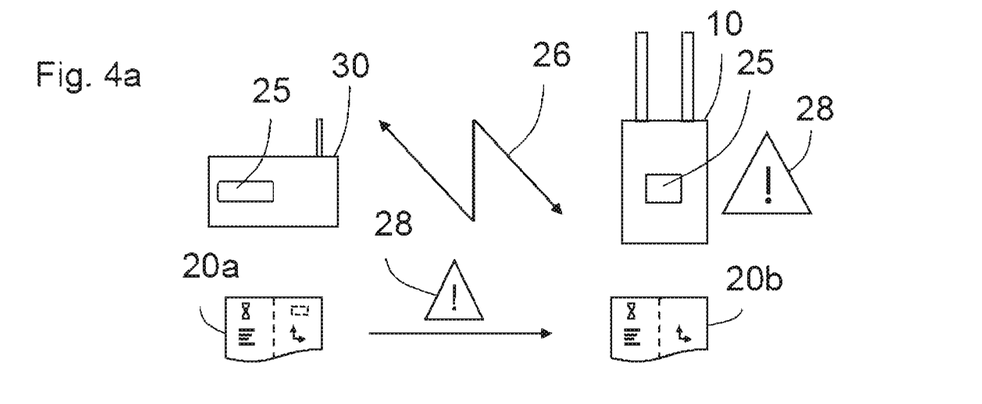
FIG. 4a shows a simplified representation of a wireless data connection between two units for issuing a warning message.
Figure 4B:
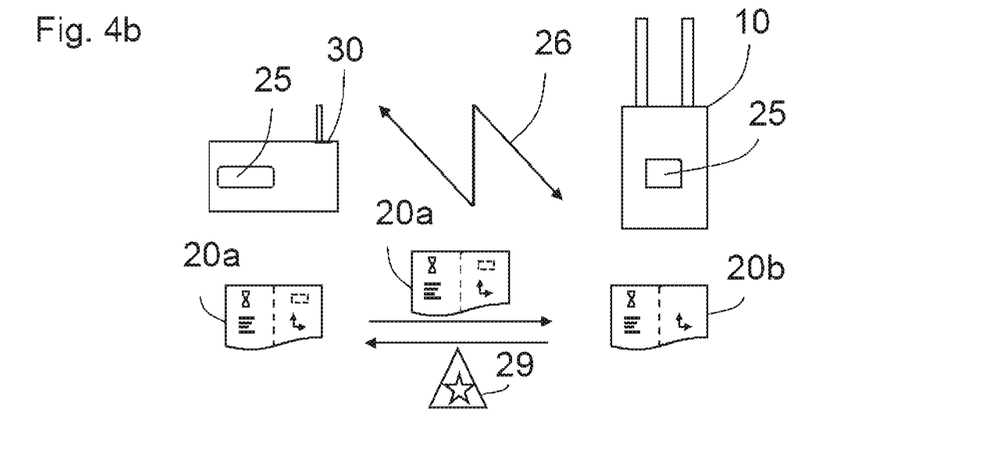
FIG. 4b shows a simplified representation of a wireless data connection between two units, wherein the user configuration of a non-current unit is updated by a current unit.
Figure 4C:
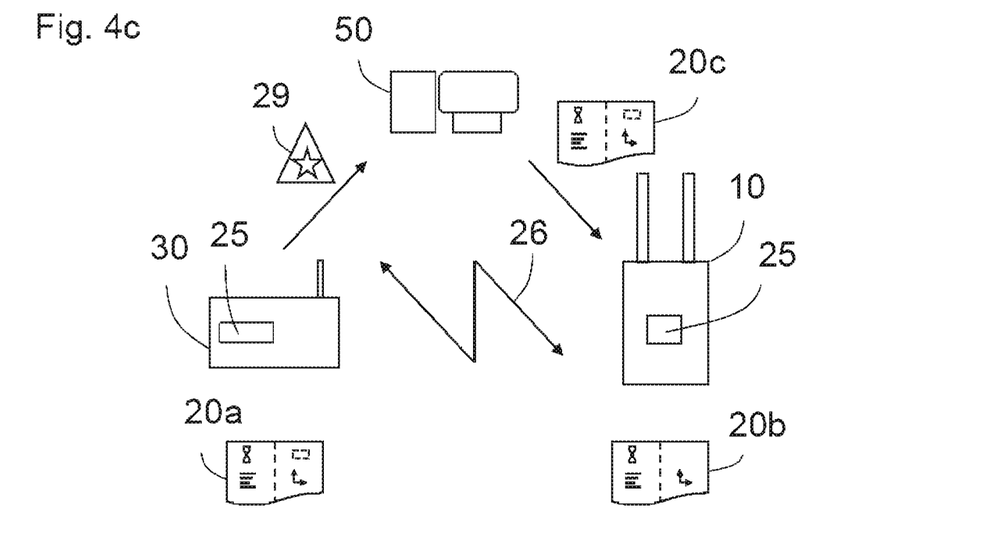
FIG. 4c shows a simplified representation of a wireless data connection between two units, wherein the user configuration of a non-current unit is updated by a third unit.

FIGS. 4a through 4c show different types of transmission of status messages, wherein the status messages are generated if the status information 21a, 21b instances do not match. In the example shown in FIG. 4a, the user configuration 20b of the industrial truck 10 is not current, as, for example, the configuration information 23 does not include the position of newly defined monitoring zones 4. In this example, the comparison of the status information 21a, 21b took place in the anchor node 30. The anchor node 30 then generates a warning message 28 and transmits it to the industrial truck 10. On a display of the industrial truck 10, this warning message 28 is then displayed, so that an operator of the industrial truck 10 is notified of the outdated version of the user configuration 20b of their industrial truck 10. If the comparison of the status information 21a, 21b is carried out on the industrial truck 10 instead, the warning message 28 is instead displayed directly on the industrial truck 10. Alternatively, the warning message 28 can also be transmitted to a third unit, for example to a computer of a user who is tasked with updating the user configurations 20a, 20b.

FIG. 4b shows the same basic situation as FIG. 4a. However, instead of generating a warning message 28, the user configuration 20b of the industrial truck 10 is updated directly. If the comparison of the status information 21a, 21b took place on the industrial truck 10, the industrial truck 10 will transmit an update request 29 to the anchor node 30. The node then transmits its user configuration 20a to the industrial truck 10. The industrial truck 10 finally replaces its existing user configuration 20b with the current user configuration 20a of the anchor node 30. If the non-current unit does not have any user configuration, the non-current unit adopts the user configuration 20a of the current unit. If the comparison of the status information 21a, 21b took place in the anchor node 30, the user configuration 20a is transmitted directly to the industrial truck 10 and an update request 29 is unnecessary in this case.

Additionally, it is possible that, as shown in FIG. 4c, the update request 29 is transmitted to a third unit, for example a computer 50. This third unit then transmits a third user configuration 20c, which is at least as current as the user configuration 20a of the current unit, in this case thus that of the anchor node 30, to the non-current unit, in this case thus the industrial truck 10.

Also included are cases where the two units are two anchor nodes 30 or two industrial trucks 10.

Figure 5:
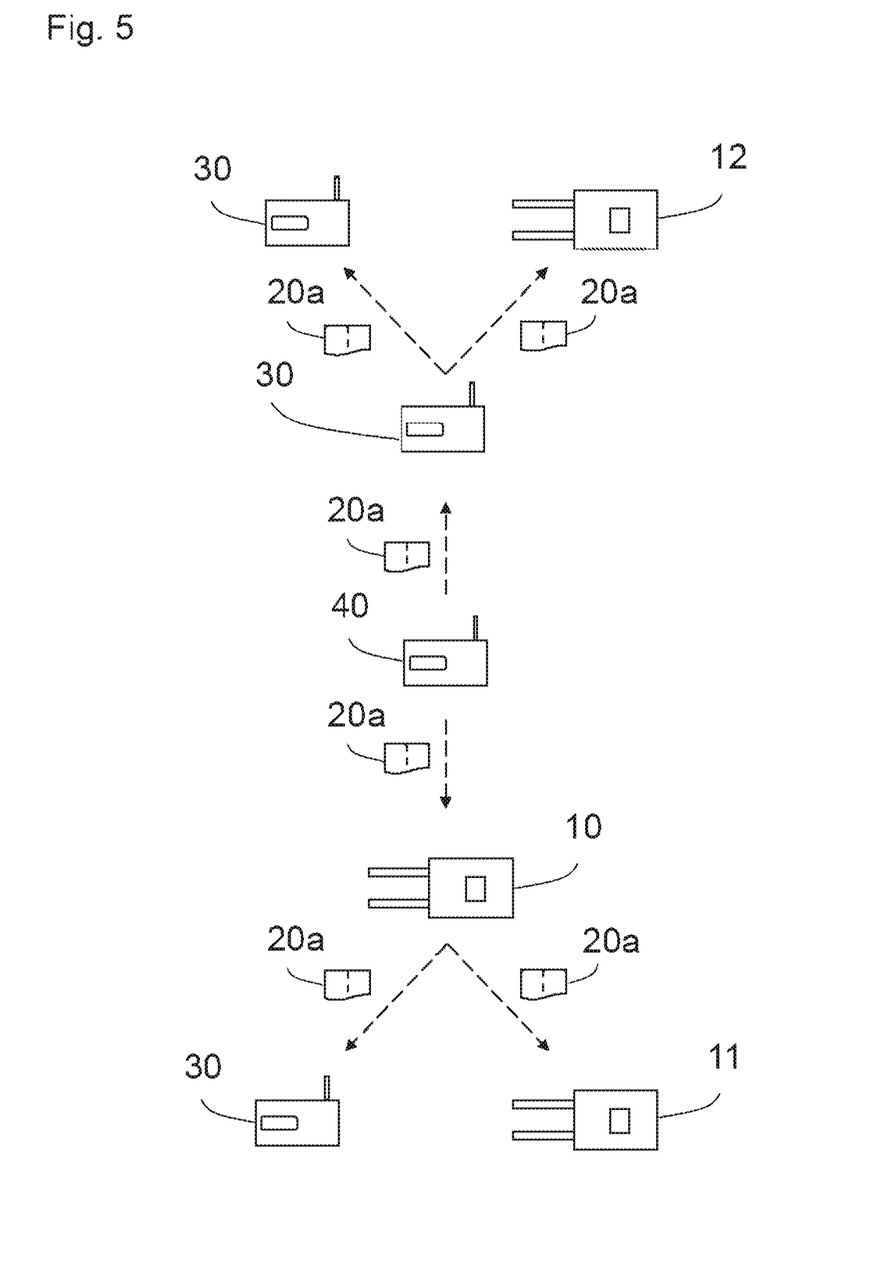
FIG. 5 shows a simplified representation of a distribution of a current user configuration to the units of a goods logistics facility by means of a source unit.

FIG. 5 shows a simplified representation of how a current version of a user configuration 20a is distributed throughout the goods logistics facility 2 via a source unit 40. The current version of the user configuration 20a is uploaded to the source unit 40, for example a stationary unit. The source unit 40 transmits this user configuration 20a to a passing industrial truck 10, which transmits this user configuration 20a, in turn, to an anchor node 30 and another industrial truck 11. Additionally, the source unit 40 transmits the user configuration 20a to another anchor node 30 within communications range, which, in turn, further transmits the user configuration 20a to a third anchor node 30 and a third industrial truck 12. In this manner, the new user configuration 20a is quickly transmitted to all units of the goods logistics facility 2. Alternatively, it can also be provided that all units receive a current user configuration 20a directly from the source unit 40.

All named features, including those taken from the drawings alone as well as individual features that are disclosed in combination with other features, are considered, alone and in combination, to be essential for the invention. Embodiments according to the invention can be fulfilled by individual features or a combination of several features. In the scope of the invention, characteristics which are designated with "in particular" or "preferably" are understood to be optional features.

REFERENCE NUMBER LIST

2 Goods logistics facility
4 Monitoring zone
10, 11, 12 Industrial truck
20a, 20b, 20c User configuration
21a, 21b Status information
22 Version information
23 Configuration information
25 Storage medium
26 Wireless data connection
28 Warning message
29 Update request
30 Anchor node
40 Source unit
50 Computer

What is claimed is:

1. A method for operating a positioning system for acquiring a position of at least one mobile unit within a goods logistics facility, wherein the positioning system includes a data communication system that has at least one stationary unit and the at least one mobile unit, the method comprising:
   determining first status information of a first user configuration of the positioning system stored on a first storage medium of a first mobile unit,
   determining second status information of a second user configuration of the positioning system stored on a second storage medium of a second mobile unit,
   transferring the first status information from the first mobile unit to the second mobile unit via a wireless data connection,
   comparing the first status information with the second status information in the second mobile unit, and generating at least one control message in the second mobile unit if the first status information does not match the second status information;
wherein:
the first status information and the second status information each comprise version information of the user configuration,
the mobile unit with newer version information is defined as a current unit and the mobile unit with older version information is defined as a non-current unit after comparing the first status information with the second status information, provided that the version information instances differ from one another,
the method further comprises transmitting a version message from the second mobile unit to the first mobile unit as the at least one control message,
the version message comprises information on whether the first mobile unit is the current unit or the non-current unit, or information that the two version information instances are identical,
the at least one control message includes an update request, which is transmitted via a wired or wireless data connection to a third mobile unit,
a third user configuration exists in the third mobile unit, the version information of which is at least as current as the newer version information,
the method further comprises transmitting the third user configuration from the third mobile unit to the non-current unit, and
updating the user configuration of the non-current unit by replacing the user configuration of the non-current unit with the third user configuration.

2. The method according to claim 1, further comprising transmitting the second status information from the second mobile unit to the first mobile unit via the wireless data connection after determining the first status information and the second status information,
comparing the first status information with the second status information in the first unit, and
generating at least one control message in the first unit if the first status information does not match the second status information.

3. The method according to claim 1, wherein the at least one control message includes a warning message that is displayed on a display of the non-current unit and/or is transmitted to the third mobile unit.

4. The method according to claim 3, further comprising:
transmitting the user configuration from the current unit via the wireless data connection to the non-current unit, and
updating the user configuration of the non-current unit by replacing the user configuration of the non-current unit with the user configuration received from the current unit.

5. The method according to claim 4, wherein:
a first part of the user configuration of the current unit that has already been transmitted is stored on the storage medium of the non-current unit if the wireless data connection is interrupted while the user configuration is being transmitted, and
a second part of the user configuration of the current unit is transmitted to the non-current unit when the wireless data connection is restored.

6. The method according to claim 1, further comprising transmitting the third user configuration from the non-current unit to another mobile unit via the wireless data connection.

7. The method according to claim 6, wherein:
the wireless data connection between the mobile units is implemented by ultra-wideband technology, WLAN, or ZigBee,
a first part of the wireless data connection is implemented with ultra-wideband technology, and
a second part of the wireless data connection is implemented with WLAN or ZigBee.

8. A positioning system for acquiring positions of at least one mobile unit in a goods logistics facility, comprising a data communication system that has at least one stationary unit and the at least one mobile unit, wherein:
the positioning system is configured to determine a first status information instance of a first user configuration of the positioning system that is stored on a first storage medium of a first mobile unit, and determines a second status information instance of a second user configuration of the positioning system that is stored on a second storage medium of a second mobile unit,
the first mobile unit is configured to transmit the first status information via a wireless data connection from the first mobile unit to the second mobile unit,
the second mobile unit is configured to compare the first status information with the second status information and, to generate a control message if the first status information does not match the second status information,
the first status information and the second status information each comprises version information of the respective first and second user configurations,
the positioning system is configured to define the mobile unit with newer version information as a current unit and the mobile unit with older version information as a non-current unit after comparing the first status information with the second status information, provided that the version information instances differ from one another,
the second mobile unit is configured to transmit a version message to the first mobile unit as the control message,
the version message comprises information on whether the first mobile unit is the current unit or the non-current unit, or information that the two version information instances are identical,
the positioning system comprises a third mobile unit,
a third user configuration exists within the third mobile unit, the version information of the third user configuration is at least as current as the newer version information,
the control message includes an update request,
the second mobile unit is configured to transmit the update request via a wired or the wireless data connection to the third mobile unit,
the third mobile unit is configured to transmit the third user configuration to the non-current unit, and
the non-current unit is configured to update its user configuration by replacing its user configuration with the third user configuration.

9. The positioning system according to claim 8, wherein:
the second mobile unit is configured to transmit the second status information via the wireless data connection from the second mobile unit to the first mobile unit,
the first mobile unit is configured to compare the first status information with the second status information, and to generate a control message, provided that the first status information does not match the second status information.

10. The positioning system according to claim 8, wherein:
the control message includes a warning message; and
the positioning system is configured to display the warning message on a display of the non-current unit and/or to transmit the warning message to a third unit.

11. The positioning system according to claim 10, wherein:
the current unit is configured to transmit its user configuration via the wireless data connection to the non-current unit,
the non-current unit is configured to update its user by replacing its user configuration with the user configuration of the current unit.

12. The positioning system according to claim 8, wherein:
at least one stationary unit is a source unit,
the positioning system comprises a control unit in which a new user configuration can be created, with the source unit being configured to receive the new user configuration from the control unit and to transmit the new user configuration via the wireless data connection to the at least one mobile unit and/or at least one additional stationary unit.

* * * * *